US012466317B2

(12) United States Patent
Fujii (10) Patent No.: US 12,466,317 B2
(45) Date of Patent: Nov. 11, 2025

(54) INATTENTION WARNING SYSTEM

(71) Applicant: TOYOTA JIDOSHA KABUSHIKI KAISHA, Toyota (JP)

(72) Inventor: Kohsuke Fujii, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/796,622

(22) Filed: Aug. 7, 2024

(65) Prior Publication Data

US 2025/0187537 A1   Jun. 12, 2025

(30) Foreign Application Priority Data

Dec. 8, 2023  (JP) .................................. 2023-207934

(51) Int. Cl.
*B60Q 9/00* (2006.01)

(52) U.S. Cl.
CPC ..................... *B60Q 9/00* (2013.01)

(58) Field of Classification Search
CPC ...... G06V 20/597; G06V 40/20; G06V 40/16; G06V 40/165; B60Q 9/00
See application file for complete search history.

(56) References Cited

U.S. PATENT DOCUMENTS

| | | | |
|---|---|---|---|
| 9,805,275 B2 | 10/2017 | Okuda | |
| 10,525,981 B2 | 1/2020 | Matsumura | |
| 10,579,056 B2 | 3/2020 | Matsumura | |
| 10,649,452 B2 | 5/2020 | Ichikawa et al. | |
| 10,706,299 B2 | 7/2020 | Matsumura | |
| 10,814,880 B2 | 10/2020 | Kishi | |
| 10,895,875 B2 | 1/2021 | Hashimoto et al. | |
| 10,915,100 B2 | 2/2021 | Matsushita et al. | |
| 11,173,919 B2 | 11/2021 | De Weser et al. | |
| 2019/0143891 A1* | 5/2019 | Aizawa | B60Q 9/008 |
| | | | 382/103 |
| 2019/0147272 A1* | 5/2019 | Yokota | G06V 40/18 |
| | | | 340/576 |
| 2019/0370577 A1* | 12/2019 | Meng | G05D 1/0061 |
| 2021/0004618 A1* | 1/2021 | Qin | G06N 3/045 |

FOREIGN PATENT DOCUMENTS

JP     2007-226666 A     9/2007

* cited by examiner

*Primary Examiner* — Omer S Khan
(74) *Attorney, Agent, or Firm* — SoraIP, Inc.

(57) ABSTRACT

A detection device configured to detect a viewing direction of a driver of a vehicle is provided. Viewing information is accumulated in a data accumulation unit. The viewing information includes a required viewing area and a required viewing time of the driver of the vehicle when the driver took a gaze off a road for a necessary visual check at each point where the vehicle travels. The viewing information accumulated in the data accumulation unit is acquired from the data accumulation unit. The warning generation unit does not generate the inattention warning when the viewing direction of the driver of the vehicle is directed toward the required viewing area for a current location of the vehicle for not more than the required viewing time for the current location of the vehicle.

4 Claims, 5 Drawing Sheets

INATTENTION WARNING SYSTEM

CROSS-REFERENCE TO RELATED APPLICATION

This application claims priority to Japanese Patent Application No. 2023-207934 filed on Dec. 8, 2023, incorporated herein by reference in its entirety.

BACKGROUND

1. Technical Field

The present disclosure relates to inattention warning systems.

2. Description of Related Art

An inattention warning system is used that generates an inattention warning when a driver of a vehicle drives inattentive while the vehicle is traveling. Drivers sometimes need to take their gaze off the road for a certain period of time or more in order to check safety etc. Therefore, it can be said that, even if a driver takes his/her gaze off the road while driving, an inattention warning is preferably not generated until the driver's gaze-off-road time exceeds a required gaze-off-road time required to check safety etc. In this case, the required gaze-off-road time varies depending on the geographical situation around the location where the vehicle is traveling and the surrounding vehicle situation. For example, when the vehicle is approaching an intersection, the required gaze-off-road time is inevitably longer in order for the driver to check right and left. Therefore, the required gaze-off-road time is set so that each road type has a different required gaze-off-road time. The road types include intersections, merging lanes on highways, exit lanes on highways, and curved roads. A driver assistance device is known in which the required gaze-off-road time is set so that each road type has a different required gaze-off-road time, and which generates an inattention warning when the driver's gaze-off-road time exceeds the required gaze-off-road time corresponding to the current road type while the vehicle is traveling toward or in an intersection or on a merging or exit lane on a highway, a curved road, etc. (see, for example, Japanese Unexamined Patent Application Publication No. 2007-226666 (JP 2007-226666 A)).

SUMMARY

However, the required gaze-off-road time actually varies depending on the location even if the road type is the same. Therefore, setting the required gaze-off-road time so that each road type such as curved roads has a different required gaze-off-road time as in the above driver assistance device is disadvantageous in that inattention warnings are generated when not needed and are not generated when needed.

In order to solve such an issue, the present disclosure provides an inattention warning system.

The inattention warning system includes: a detection device configured to detect a viewing direction of a driver of a vehicle; a warning generation unit configured to generate an inattention warning to the driver of the vehicle; and a processor.

Viewing information is accumulated in a data accumulation unit. The viewing information includes a required viewing area and a required viewing time of the driver of the vehicle when the driver took a gaze off a road for a necessary visual check at each point where the vehicle travels.

The processor acquires from the data accumulation unit the viewing information accumulated in the data accumulation unit.

The warning generation unit does not generate the inattention warning when the viewing direction of the driver of the vehicle is directed toward the required viewing area for a current location of the vehicle for not more than the required viewing time for the current location of the vehicle.

Since inattention warnings are generated when needed and are not generated when not needed, the driver is less likely to feel annoyed by them.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
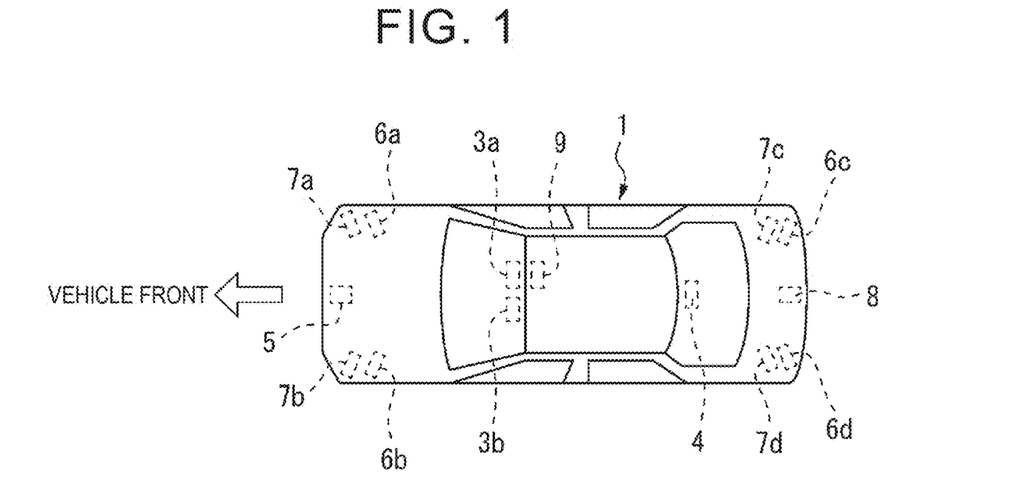
FIG. 1 is a top view of the vehicle shown schematically.
Figure 2:
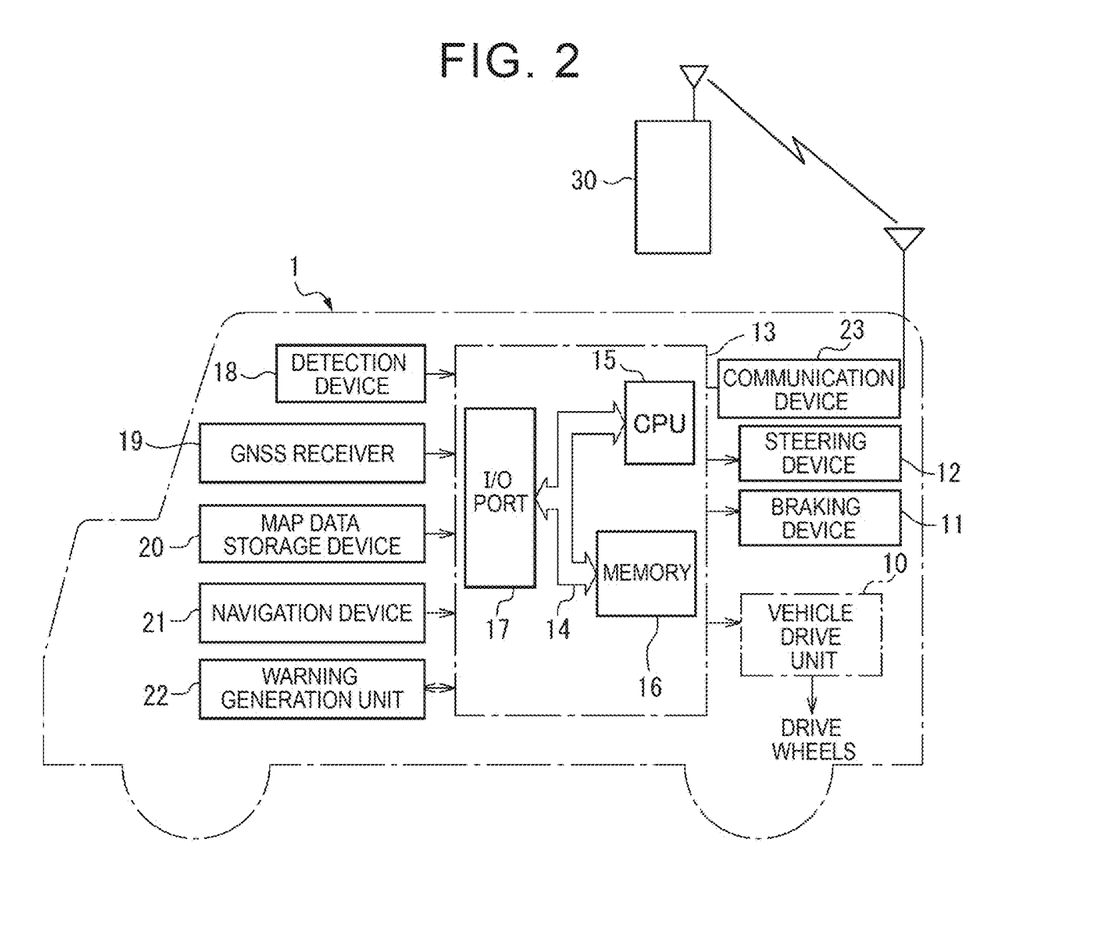
FIG. 2 is a diagram illustrating a functional configuration of a vehicle.

FIG. 1 schematically shows a vehicle 1 when viewed from above, and FIG. 2 shows a functional configuration of the vehicle 1 shown in FIG. 1. The vehicle 1 is capable of either manual driving or automatic driving. Referring to FIG. 2, reference numeral 10 denotes a vehicle driving unit for applying a driving force to driving wheels of the vehicle 1, 11 denotes a braking device for braking the vehicle 1, 12 denotes a steering device for steering the vehicle 1, and 13 denotes an electronic control unit mounted in the vehicle 1. As shown in FIG. 2, the electronic control unit 13 is composed of a digital computer and includes a CPU (processor) 15, memory 16 including a ROM and a RAM that are connected to each other by a bi-directional buss 14, and an input/output 17.

On the other hand, as shown in FIG. 2, various sensors 18 required for the vehicle 1 to perform automatic driving are installed in the vehicle 1. These sensors 18 include sensors for detecting the state of the vehicle 1 and sensors for detecting the surroundings of the vehicle 1. In this case, an acceleration sensor, a speed sensor, an azimuth angle sensor, and a geomagnetic sensor are used as sensors for detecting the state of the vehicle 1. As sensors for detecting the surroundings of the vehicle 1, cameras for photographing the front, side, and rear of the vehicle 1, LIDARs for detecting the front, side, and rear of the vehicle 1, a radar, a clearance sonar, and the like are used.

FIG. 1 shows an example of a sensor installed in a vehicle 1. In the embodiment shown in FIG. 1, the vehicle 1 is provided with front cameras 3a, 3b that capture an image of the front of the vehicle 1, a rear camera 4 that captures an image of the rear of the vehicle 1, a long-distance millimeter wave radar 5 that emits millimeter waves toward the front of the vehicle 1, medium-distance millimeter wave radars 6a, 6b, 6c, 6d that emits millimeter waves toward the side of the vehicle 1, LIDARs 7a, 7b, 7c, 7d that emits laser beams toward the side of the vehicle 1, and a clearance sonar 8 that emits ultrasonic waves toward the rear of the vehicle 1. In addition, a detection device 9 for detecting the gaze direction of the driver and the direction in which the driver's is directed (hereinafter referred to as face orientation) is installed in the vehicle cabin.

The detection device 9 includes, for example, an infrared LED for irradiating the driver's face with infrared rays, and an infrared camera for detecting reflected light from the face and reflected light of infrared rays in the cornea of the eyeball. With this detection device 9, the driver's gaze direction can be detected from the reflected light of the infrared rays in the cornea, and the face orientation of the driver can also be detected from the infrared image of the face. Note that the detection device 9 is an example, and other detection devices may be used instead of the detection device 9.

Returning to FIG. 2, the vehicle 1 is provided with a GNSS (Global Navigation Satellite System) receiver 19, a map data storage device 20, a navigational device 21, and a warning generation unit 22 for issuing an inattention warning to the driver of the vehicle 1. GNSS receiver 19 can detect the current location of the vehicle 1 (for example, the latitude and longitude of the vehicle 1) based on information obtained from a plurality of satellites. Therefore, the current location of the vehicle I can be acquired by GNSS receiver 19. As GNSS receiver 19, for example, a GPS receiving device is used. In addition, the map data storage device 20 stores map data etc. required for traveling of the vehicle 1. The map data also includes information about the road. The various sensors 18, GNSS receiver 19, the map data storage device 20, the navigational device 21, and the warning generation unit 22 are connected to the electronic control unit 13. Further, a communication device 23 connected to the electronic control unit 13 is mounted on the vehicle 1, and the electronic control unit 13 can communicate with the server 30 via the communication device 23. Although not shown in the drawings, the server 30 include a CPU (processor) connected to each other by a bidirectional bus, and memories including a ROM and a RAM.

In the example illustrated in FIG. 2, the vehicle 1 can be manually driven, and when the vehicle 1 is requested to perform travel control by automatic driving, the vehicle I can be caused to perform travel control by automatic driving. In the example shown in FIG. 2, the vehicle drive unit 10 of the vehicle 1 is constituted by an electric motor driven by a secondary battery or an electric motor driven by a fuel cell. The drive wheels are driven and controlled by these electric motors in accordance with the output signals of the electronic control unit 13. In the example shown in FIG. 2, when the vehicle 1 is requested to perform travel control by automatic driving, braking control of the vehicle 1 is performed by the braking device 11 in accordance with an output signal from the electronic control unit 13. The steering control of the vehicle 1 is also performed by the steering device 12 in accordance with an output signal of the electronic control unit 13.

While driving the vehicle 1, the driver of the vehicle 1 sometimes takes his/her gaze off the road for a certain period of time or more to look at other vehicles in order to check their presence and movement. The driver of the vehicle I often takes his/her gaze off the road for a certain period of time or more to look at moving objects such as pedestrians in order to check their presence and movement, or often takes his/her gaze off the road for a certain period of time or more to look at stationary objects such as signals and signs in order to check their presence and content. Taking a gaze off the road to look at such various objects for a certain period of time or more is necessary to check safety etc., and the time during which the driver is looking at the various objects is a viewing time necessary to check safety etc. That is, it is preferable not to generate an inattention warning as long as the viewing time of these various objects is within the viewing time necessary to check safety etc. It can be said that it is preferable not to generate an inattention warning until the driver keeps looking at these various objects for more than the viewing time necessary to check safety etc.

Figure 3:
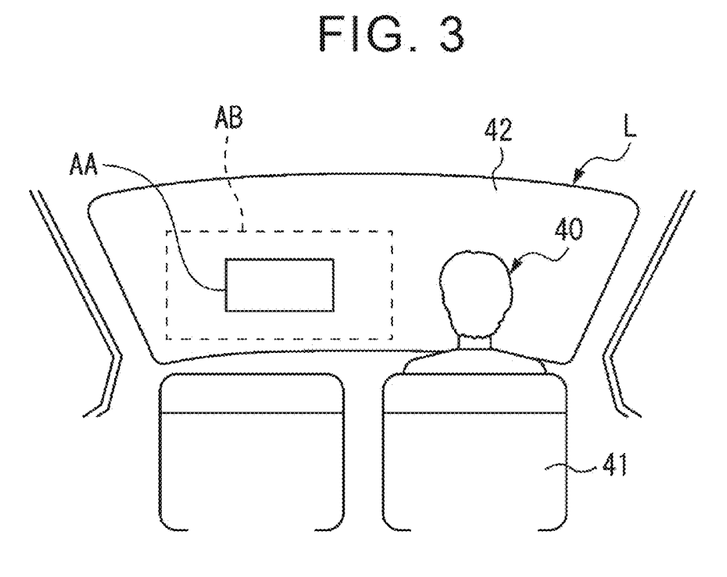
FIG. 3 is a front view from the interior of the vehicle.

This will be described referring to FIG. 3, FIG. 4A and FIG. 4B. First, referring to FIG. 3, FIG. 3 shows a front view from the interior of the vehicle 1, and in FIG. 3, 40 represents a driver, 41 represents a driver's seat, and 42 represents a front window. In FIG. 3, AA shows an example of an area in a scene ahead of the vehicle toward which the gaze of the driver 40 is directed off the road. In the embodiment shown in FIG. 3, the area AA indicates a required viewing area toward which the gaze of the driver 40 is directed off the road when the driver needs to look at the area to check safety etc.

On the other hand, in FIG. 3, AB shows an example of the area in a scene in front of the vehicle toward which the driver 40 directs his/her face by taking his/her off the road. In the example shown in FIG. 3, the area AB indicates a required face orientation area toward which the face of the driver 40 is directed when the gaze of the driver 40 is directed off the road toward the required viewing area AA in order to check safety etc. It is known that the gaze direction of the driver 40 does not exactly coincide with the face orientation of the driver 40, but there is a correlation between the gaze direction of the driver 40 and the face orientation of the driver 40. For example, when the area toward which the gaze of the driver 40 is directed is the required viewing area AA as shown in FIG. 3, the required face orientation area AB toward which the face of the driver 40 is directed is an area including required viewing area AA and larger than the required viewing area AA as shown in FIG. 3. When the gaze of the driver 40 is directed toward the required viewing area AA, the face of the driver 40 is highly probably oriented toward the required face orientation area AB.

Figure 4A:
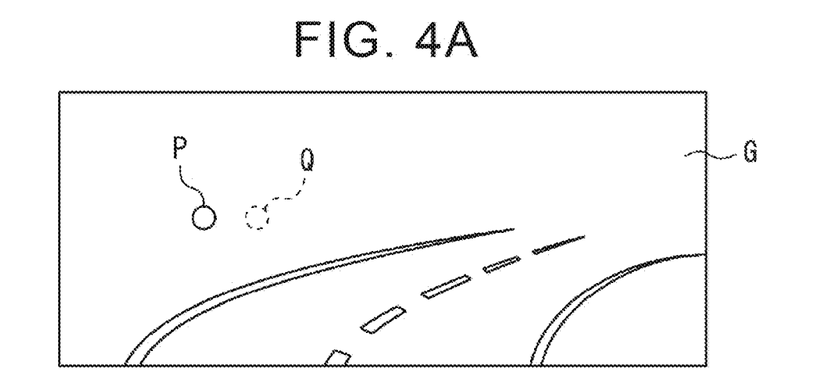
FIG. 4A is a diagram illustrating a vehicle-front view.
Figure 4B:
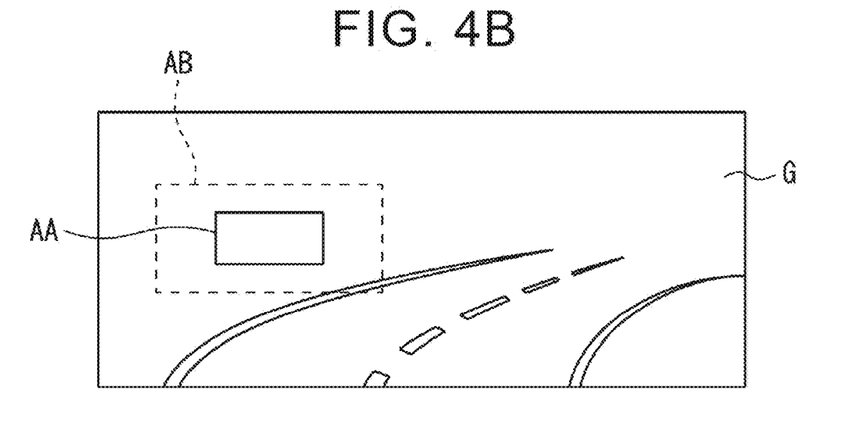
FIG. 4B is another illustration of a diagram showing an image in front of a vehicle.

On the other hand, FIGS. 4A and 4B show an image G of the scenery in front of the vehicles taken by the front cameras 3a, 3b. It should be noted that, FIGS. 4A and 4B shows simplified images rather than actual images for the sake of description, and only white lines on the road are shown in FIGS. 4A and 4B. Incidentally, FIG. 4A shows an example of the viewing position P in the scene in front of the vehicle toward which the gaze of the driver 40 is directed, and an example of the face orientation position Q in the scene in the front of the vehicle toward which the face of the driver 40 is directed. In this case, the viewing position P is determined based on the gaze direction of the driver detected by the detection device 9 and the image data captured by the front cameras 3a, 3b. The face orientation position Q is obtained based on the face orientation of the driver detected by the detection device 9 and the image data captured by the front cameras 3a, 3b.

Now, as described above, while driving the vehicle 1, the driver may need to take his/her gaze off the road for a certain period of time or more in order to check safety etc. Therefore, it can be said that an inattention warning is preferably not generated until the driver's gaze-off-road time exceeds the required gaze-off-road time required to check safety etc. In this case, a location where a driver needs to take his/her gaze off the road to check safety etc., a required viewing area in a scene in front of the vehicle, and a required viewing time are common to any vehicle. Therefore, for each location on the road, information on the viewing position and information on the viewing time when a driver actually needed to take his/her gaze off the road are accumulated from a large number of vehicles. From this accumulation result, each vehicle can acquire, for each location on the road, the required viewing area where the driver actually needs to take his/her gaze off the road, and the required viewing time during which the driver actually needs to keep his/her gaze off the road. As a result, when the driver needs to take his/her gaze off the road while driving, it is possible not to generate an inattention warning until the driver's gaze-off-road time exceeds the required gaze-off-road time required to check safety etc.

It is to be noted that the determination accuracy is higher when determining whether the driver 40 of the vehicle 1 is viewing the required viewing area AA based on the gaze direction of the driver 40 than when determining whether the driver 40 of the vehicle 1 is viewing the required viewing area AA based on the face orientation of the driver 40. However, for example, when the driver 40 of the vehicle 1 wears infrared cut glasses, the gaze direction of the driver 40 cannot be detected by the detection device 9. In this case, there is no choice but to determine whether the driver 40 of the vehicle 1 is viewing the required viewing area AA based on the face orientation of the driver 40.

Therefore, in the embodiment according to the present disclosure, when the detection device 9 is able to detect the gaze direction of the driver 40, it is determined whether the driver 40 of the vehicle 1 is viewing the required viewing area AA based on the gaze direction of the driver 40. When the detection device 9 is unable to detect the gaze direction of the driver 40, it is determined whether the driver 40 of the vehicle 1 is viewing the required viewing area AA based on the face orientation of the driver 40. Hereinafter, an embodiment according to the present disclosure will be described with reference to FIGS. 5 to 7.

Figure 5:
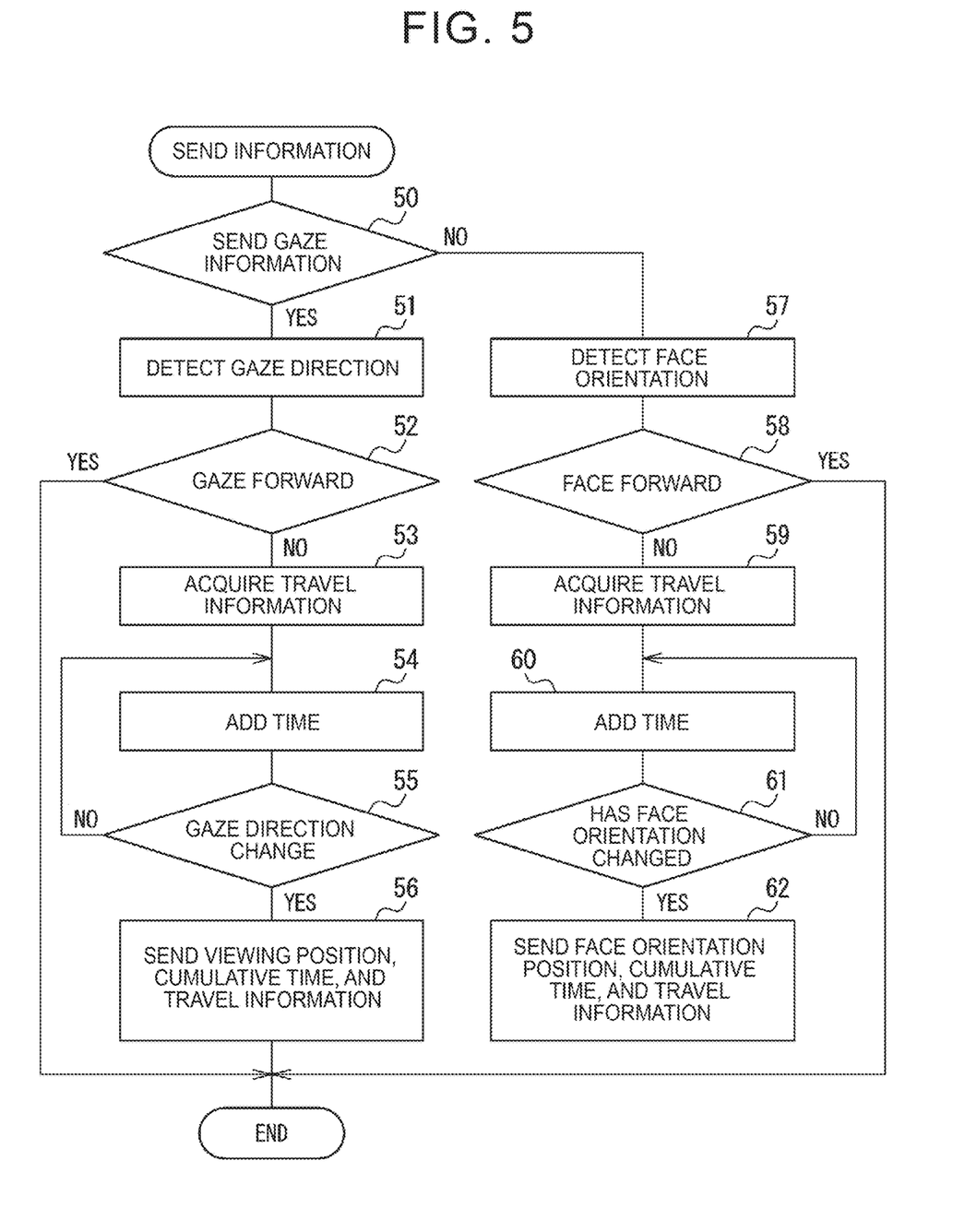
FIG. 5 is a flowchart for transmitting information from a vehicle.

FIG. 5 shows a transmission routine which is repeatedly executed in the electronic control unit 13 of the vehicle 1 in order to send, from the vehicle 1 to the server 30, information obtained regarding the location of the vehicle 1, the direction of travel of the vehicle 1, the viewing position P in the scene in front of the vehicle, the viewing time, the face orientation position Q in the scene in front of the vehicle, and the like. Note that FIG. 5 shows, as an example, a case in which the information on the viewing position P of the driver 40 and the information on the face orientation position Q of the driver 40 are alternately sent to the server 30.

Referring to FIG. 5, first, in step 50, it is determined whether information regarding the gaze direction of the driver 40 is in the order in which to send the information. When it is determined that the order in which the information regarding the gaze direction of the driver 40 is to be transmitted is determined, the process proceeds to step 51, and the gaze direction of the driver 40 is detected by the detection device 9. Next, in step 52, it is determined whether the gaze direction of the driver 40 is forward in the direction of travel of the vehicle 1, that is, whether the driver is not taking his/her gaze off the road. When it is determined that the gaze direction of the driver 40 is forward in the direction of travel of the vehicle 1, that is, when it is determined that the driver is not taking his/her gaze off the road, the processing cycle is ended. When the gaze direction of the driver 40 was not able to be detected by the detection device 9, the processing cycle ends.

On the other hand, when it is determined in step 52 that the gaze direction of the driver 40 is not forward in the direction of travel of the vehicle 1, that is, when it is determined that the driver's gaze is off the road, the process proceeds to step 53, and the travel information of the vehicle 1 including the current location and the direction of travel of the vehicle 1 is acquired. In this case, based on the received signal of GNSS receiver 19 and the map data stored in the map data storage device 20, information regarding the current location of the vehicle 1 is acquired, and the direction of travel of the vehicle 1 obtained from a change in location of the vehicle 1 is acquired. Then, in step 54, the operation of accumulating the elapsed time is started. Next, in step 55, it is determined whether the gaze direction of the driver 40 has changed. When the gaze direction of the driver 40 does not change, the process returns to step 54, and the operation of accumulating the cumulative elapsed time is continued.

On the other hand, when it is determined that the gaze direction of the driver 40 has changed, the process proceeds to step 56. In step 56, the viewing position P is determined based on the gaze direction of the driver 40 prior to the change and the image data captured by the front cameras 3a, 3b. Data regarding the image G including the viewing position P as shown in FIG. 4A is sent to the server 30 together with the cumulative elapsed time and the travel information of the vehicle 1 acquired in step 53.

On the other hand, when it is determined in step 50 that the order in which the information regarding the gaze direction of the driver 40 is to be sent is not the order in which the information is to be sent, that is, when it is determined that the order in which the information regarding the face orientation of the driver 40 is to be sent is the order, the process proceeds to step 57, and the face orientation of the driver 40 is detected by the detection device 9. Next, in step 58, it is determined whether the face orientation of the driver 40 is forward in the direction of travel of the vehicle 1, that is, whether the driver is not taking his/her gaze off the road. When it is determined that the face orientation of the driver 40 is forward in the direction of travel of the vehicle 1, that is, when it is determined that the driver is not taking his/her gaze off the road, the processing cycle is ended.

On the other hand, when it is determined in step 58 that the face orientation of the driver 40 is not forward in the direction of travel of the vehicle 1, that is, when it is determined that the driver's gaze is off the road, the process proceeds to step 59. Then, based on the received signal of GNSS receiver 19 and the map data stored in the map data storage device 20, the travel information of the vehicle 1 including the current location and the travel direction of the vehicle 1 is acquired. Then, in step 60, the operation of accumulating elapsed time is started. Next, in step 61, it is determined whether the face orientation of the driver 40 has changed. When the face orientation of the driver 40 does not change, the process returns to step 60, and the operation of accumulating the elapsed time is continued.

On the other hand, when it is determined that the face orientation of the driver 40 has changed, the process proceeds to step 62. In step 62, the face orientation position Q is determined based on the face orientation of the driver 40 prior to the change and the image data captured by the front cameras 3a, 3b. Data regarding the image G including the face orientation position Q as shown in FIG. 4A is sent to the server 30 together with the cumulative elapsed time and the travel information of the vehicle 1 acquired in step 59.

Figure 6:
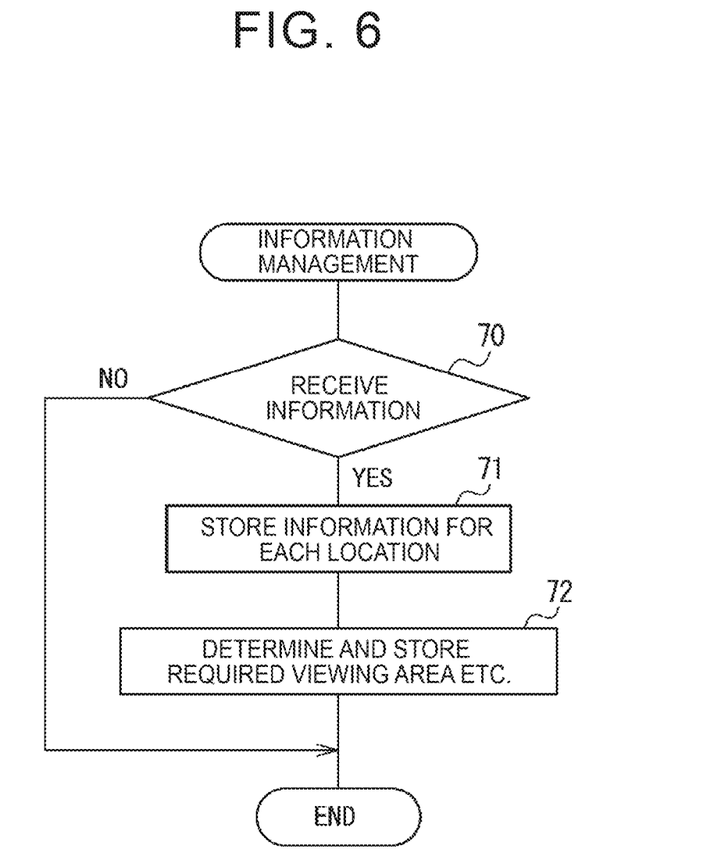
FIG. 6 is a flow chart for performing an information-management process in a server.

Note that the operation of sending information to the server 30 shown in FIG. 5 is performed from a large number of vehicles, and the information sent from the large number of vehicles is managed by the server 30. FIG. 6 shows an information management routine of the server 30 that is executed by a processor in the server 30.

Referring to FIG. 6, first, in step 70, it is determined whether data regarding the image G including the viewing position P as shown in FIG. 4A, an cumulative value of elapsed time, and travel information of the vehicle 1 are received from the vehicle. Alternatively, it is determined whether the data regarding the image G including the face orientation position Q as shown in FIG. 4A, the cumulative value of the elapsed time, and the travel information of the vehicle 1 are received. When it is determined in step 70 that the data regarding the image G including the viewing position P, the cumulative value of the elapsed time, and the travel information of the vehicle 1 has been received from the vehicle, the process proceeds to step 71. In the required viewing area memory in the server 30, the received data regarding the image G including the viewing position P and the cumulative value of the elapsed time are stored for each direction of travel of the vehicle 1 and each current location of the vehicle 1 based on the received travel information. On the other hand, when it is determined in step 70 that the data regarding the image G including the face orientation position Q, the cumulative value of the elapsed time, and the travel information of the vehicle I have been received, the processing proceeds to step 71. In a required face orientation area memory in the server 30, the received data regarding the image G including the face orientation position Q and the cumulative value of the elapsed time are stored for each direction of travel of the vehicle 1 and each current location of the vehicle 1 based on the received travel information.

Next, in step 72, based on the information stored in the required viewing area memory and the information stored in the required face orientation area memory, the required viewing area AA and the required face orientation area AB shown in FIG. 3 are determined for each direction of travel of the vehicle 1 and each current location of the vehicle 1. In this case, in the embodiment according to the present disclosure, for each direction of travel of the vehicle 1 and each current location of the vehicle 1, the required viewing area AA and the required face orientation area AB on the image G are determined and stored as shown in FIG. 4B.

For example, for each direction of travel of the vehicle 1 and each current location of the vehicle 1, the reference image G is determined from the image G, and the viewing position P on the image G other than the determined reference image G is corrected to the viewing position P on the reference image G. An area where the density at which the corrected viewing position P is present on the reference image G is equal to or higher than a certain density is defined as the required viewing area AA. At this time, of the cumulative values of the elapsed viewing time for the viewing position P stored in the visual necessity area memory, the average value of the cumulative values of the elapsed viewing time for the viewing position P belonging to the required viewing area AA is the required viewing time.

Similarly, for example, for each direction of travel of the vehicle 1 and each current location of the vehicle 1, a reference image G is determined from the image G, and a face orientation position Q on the image G other than the determined reference image G is corrected to a face orientation position Q on the reference image G. An area in which the density at which the corrected face orientation position Q is present on the reference image G is equal to or higher than a certain density is set as the required face orientation area AB. At this time, among the cumulative values of the elapsed viewing time of the face orientation position Q stored in the required face direction area memory, the average value of the cumulative values of the elapsed viewing time of the face orientation position Q belonging to the required face orientation area AB is set as the required face orientation time.

Figure 7:
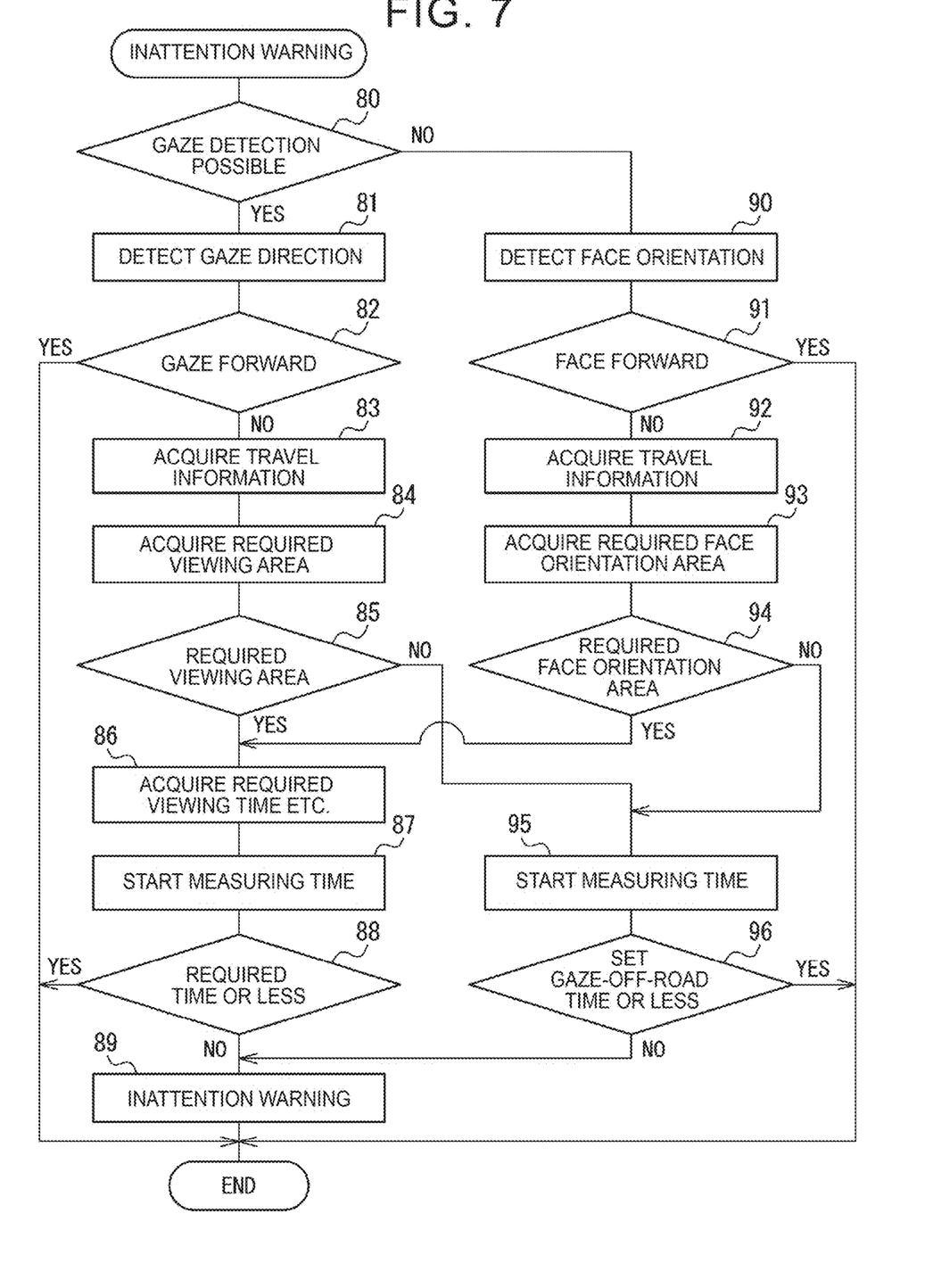
FIG. 7 is a flowchart for performing an inattention warning process in the vehicle.

FIG. 7 shows a routine for executing an inattention warning process for the driver 40 of the vehicle 1. This routine is executed in the electronic control unit 13 of the vehicle 1 by interruption at regular time intervals.

Referring to FIG. 7, first, in step 80, it is determined whether the gaze direction of the driver 40 can be detected by the detection device 9. When it is determined that the gaze direction of the driver 40 is detectable, the process proceeds to step 81, and the gaze direction of the driver 40 is detected by the detection device 9. Next, in step 82, it is determined whether the gaze direction of the driver 40 is forward in the direction of travel of the vehicle 1, that is, whether the driver is not taking his/her gaze off the road. When it is determined that the gaze direction of the driver 40 is forward in the direction of travel of the vehicle 1, that is, when it is determined that the driver is not taking his/her gaze off the road, the processing cycle is ended.

On the other hand, when it is determined in step 82 that the gaze direction of the driver 40 is not forward in the direction of travel of the vehicle 1, that is, when it is determined that the driver's gaze is off the road, the process proceeds to step 83, and the travel information of the vehicle 1 including the current location and the direction of travel of the vehicle 1 is acquired. In this case, based on the received signal of GNSS receiver 19 and the map data stored in the map data storage device 20, information regarding the current location of the vehicle 1 is acquired, and the direction of travel of the vehicle 1 obtained from a change in location of the vehicle 1 is acquired. Next, in step 84, the server 30 is accessed, and data regarding the image G including the required viewing area AA for the current position of the vehicle 1 is acquired from the data regarding the image G including the required viewing area AA stored in the server 30.

Then, in step 85, it is determined whether the gaze direction of the driver 40 is directed toward the acquired required viewing area AA. That is, the viewing position P is obtained based on the detected gaze direction of the driver 40 and the image data captured by the front cameras 3*a*, 3*b*, and it is determined whether the viewing position P belongs to the required viewing area AA on the image G shown in FIG. 4B.

If it is determined in step 85 that the gaze direction of the driver 40 is directed toward the required viewing area AA, the process proceeds to step 86. In step 86, the server 30 is accessed again, and the required viewing time for the current location of the vehicle 1 is acquired from the required viewing time stored in the server 30. Then, in step 87, calculation of the elapsed time is started. Then, in step 88, it is determined whether the elapsed time is equal to or less than the acquired required viewing time. When it is determined that the elapsed time is equal to or less than the acquired required viewing time, the processing cycle ends. On the other hand, when it is determined that the elapsed time is not equal to or less than the acquired required viewing time, the process proceeds to step 89, and the warning generation unit 22 generates an inattention warning to the driver of the vehicle 1. This inattention warning is performed by, for example, a screen display of a message such as "Please look straight ahead" or by voice.

On the other hand, when it is determined in step 85 that the gaze direction of the driver 40 is not directed to the acquired required viewing area AA, the process proceeds to step 95, and calculation of the elapsed time is started. Next, in step 96, it is determined whether the elapsed time is equal to or less than the set gaze-off-road time. The set gaze-off-road time is set in advance to a short time within a range in which the drive can be allowed to take his/her gaze off the road, and the set gaze-off-road time is a short time compared to the acquired required viewing time. As described above, when the gaze direction of the driver 40 is directed toward the acquired required viewing area AA, no inattention warning will be generated until the elapsed time exceeds the acquired required viewing time. Therefore, the driver is less likely to feel annoyed by inattention warnings.

On the other hand, when it is determined in step 80 that the gaze direction of the driver 40 is undetectable, the process proceeds to step 90, and the face orientation of the driver 40 is detected by the detection device 9. Next, in step 91, it is determined whether the face orientation of the driver 40 is forward in the direction of travel of the vehicle 1, that is, whether the driver is not taking his/her gaze off the road. When it is determined that the face orientation of the driver 40 is forward in the direction of travel of the vehicle 1, that is, when it is determined that the driver is not taking his/her gaze off the road, the processing cycle is ended.

On the other hand, when it is determined in step 91 that the face orientation of the driver 40 is not forward in the direction of travel of the vehicle 1, that is, when it is determined that the driver's gaze is off the road, the process proceeds to step 92, and travel information of the vehicle I including the current location and the direction of travel the vehicle 1 is acquired. In this case, based on the reception signal of GNSS receiver 19 and the map data stored in the map data storage device 20, information regarding the current location of the vehicle 1 is acquired, and the direction of travel of the vehicle 1 obtained from a change in location of the vehicle 1 is acquired. Next, in step 93, the server 30 is accessed, and data relating to the image G including the required face orientation area AB at the current location of the vehicle 1 is acquired from the data relating to the image G including the required face orientation area AB stored in the server 30.

Then, in step 94, it is determined whether the face orientation of the driver 40 is directed toward the acquired required face orientation area AB. That is, the face orientation position Q is obtained based on the detected face orientation of the driver 40 and the image data captured by the front cameras 3a, 3b, and it is determined whether the face orientation position Q belongs to the required face orientation area AB on the image G shown in FIG. 4B.

If it is determined in step 94 that the face orientation of the driver 40 is directed toward the acquired required face orientation area AB, the process proceeds to step 86. In step 86, the server 30 is accessed again, and the required face orientation time at the current location of the vehicle 1 is acquired from the required face orientation times updated in the server 30. Then, in step 87, calculation of the elapsed time is started. Then, in step 88, it is determined whether the elapsed time is equal to or less than the acquired required face orientation time. When it is determined that the elapsed time is equal to or less than the acquired required face orientation time, the processing cycle is ended. On the other hand, when it is determined that the elapsed time is not equal to or less than the acquired required face orientation time, the process proceeds to step 89, and the warning generation unit 22 generates an inattention warning to the driver of the vehicle 1.

On the other hand, when it is determined in step 94 that the face orientation of the driver 40 is not directed toward the acquired required face orientation area AB, the process proceeds to step 95, and calculation of the elapsed time is started. Next, in step 96, it is determined whether the elapsed time is equal to or less than the set gaze-off-road time. This set gaze-off-road time is shorter than the acquired required face orientation time. In this way, when the face orientation of the driver 40 is directed toward the acquired required face orientation area AB, no inattention warning is generated until the elapsed time exceeds the acquired required face orientation time. Therefore, the driver is less likely to feel annoyed by inattention warnings.

As described above, in the present disclosure, the inattention warning system includes the detection device 9 capable of detecting the viewing direction of the driver 40 of the vehicle 1, the warning generation unit 22 that generates an inattention warning to the driver 40 of the vehicle 1, and the processor 15. Viewing information is accumulated in the data accumulation unit. The viewing information includes a required viewing area AA and a required viewing time of the driver 40 of the vehicle 1 when the driver 40 took a gaze off a road for a necessary visual check at each point where the vehicle 1 travels. The processor 15 acquires from the data accumulation unit the viewing information accumulated in the data accumulation unit. The warning generation unit 22 does not generate an inattention warning when the viewing direction of the driver 40 of the vehicle is directed toward the required viewing area AA for a current location of the vehicle 1 for not more than the required viewing time for the current location of the vehicle 1.

In this case, in the present embodiment, when the viewing direction of the driver 40 of the vehicle 1 is directed toward the required viewing area AA of the driver 40 for the current location of the vehicle 1 for more than the required viewing time for the current location of the vehicle 1, the processor 15 causes the warning generation unit 22 to generate an inattention warning. In the present embodiment, the above data accumulation unit is a server 30, the viewing information sent from a plurality of different vehicles to the server 30 is accumulated in the server 30, and the required viewing area AA and the required viewing time are determined based on the viewing information accumulated in the server 30.

In the embodiment of the present disclosure, the detection device 9 is configured to detect the face orientation of the driver 40 of the vehicle 1 in addition to the gaze direction of the driver 40 of the vehicle 1. The viewing information including the required viewing area AA and the required viewing time of the driver 40 when the necessary visual check was performed and the viewing information including the required face orientation area AB and required face orientation time of the driver 40 when the necessary visual check was performed are accumulated in the data accumulation unit. In the case where the detection device 9 is able to detect the gaze direction of the driver 40 of the vehicle 1, the warning generation unit 22 does not generate an inattention warning when the gaze direction of the driver 40 is directed toward the required viewing area AA of the driver 40 for the current location of the vehicle 1 for not more than the required viewing time for the current location of the vehicle 1. In the case where the detection device 9 is unable to detect the gaze direction of the driver 40 of the vehicle 1, the warning generation unit 22 does not generate an inattention warning when the face orientation of the driver 40 is directed toward the required face orientation area AB of the driver for the current location of the vehicle 1 for not more than the required face orientation time for the current location of the vehicle 1.

In this case, in this embodiment, the above data accumulation unit is the server 30, and the viewing information sent from a plurality of different vehicles to the server 30 is accumulated in the server 30. Based on the viewing information accumulated in the server 30, the required viewing area AA, the required viewing time, the required face orientation area AB, and the required face orientation time are determined.

What is claimed is:

1. An inattention warning system, comprising:
   a detection device configured to detect a viewing direction of a driver of a vehicle;
   a warning generation unit configured to generate an inattention warning to the driver of the vehicle; and
   a processor, wherein
   viewing information is accumulated in a data accumulation unit, the viewing information including a required viewing area and a required viewing time of the driver of the vehicle when the driver took a gaze off a road for a necessary visual check at each point where the vehicle travels,
   the processor acquires from the data accumulation unit the viewing information accumulated in the data accumulation unit, and
   the warning generation unit does not generate the inattention warning when the viewing direction of the driver of the vehicle is directed toward the required viewing area for a current location of the vehicle for not more than the required viewing time for the current location of the vehicle;
   wherein:
   the detection device is configured to detect a face orientation of the driver of the vehicle in addition to a gaze direction of the driver of the vehicle, and the viewing information including the required viewing area and the required viewing time of the driver when the necessary visual check was performed and viewing information including a required face orientation area and a required face orientation time when the necessary visual check was performed are accumulated in the data accumulation unit;
   in a case where the detection device is able to detect the gaze direction of the driver of the vehicle, the warning generation unit does not generate the inattention warning when the gaze direction of the driver is directed toward the required viewing area of the driver for the current location of the vehicle for not more than the required viewing time for the current location of the vehicle; and
   in a case where the detection device is unable to detect the gaze direction of the driver of the vehicle, the warning generation unit does not generate the inattention warning when the face orientation of the driver is directed toward the required face orientation area of the driver for the current location of the vehicle for not more than the required face orientation time for the current location of the vehicle.

2. The inattention warning system according to claim 1, wherein when the viewing direction of the driver of the vehicle is directed toward the required viewing area of the driver for the current location of the vehicle for more than the required viewing time for the current location of the vehicle, the processor causes the warning generation unit to generate the inattention warning.

3. The inattention warning system according to claim 1, wherein the data accumulation unit is a server, the viewing information sent from a plurality of different vehicles to the server is accumulated in the server, and the required viewing area and the required viewing time are determined based on the viewing information accumulated in the server.

4. The inattention warning system according to claim 1, wherein the data accumulation unit is a server, the viewing information sent from a plurality of different vehicles to the server is accumulated in the server, and the required viewing area, the required viewing time, the required face orientation area, and the required face orientation time are determined based on the viewing information accumulated in the server.

* * * * *